Patented June 7, 1949

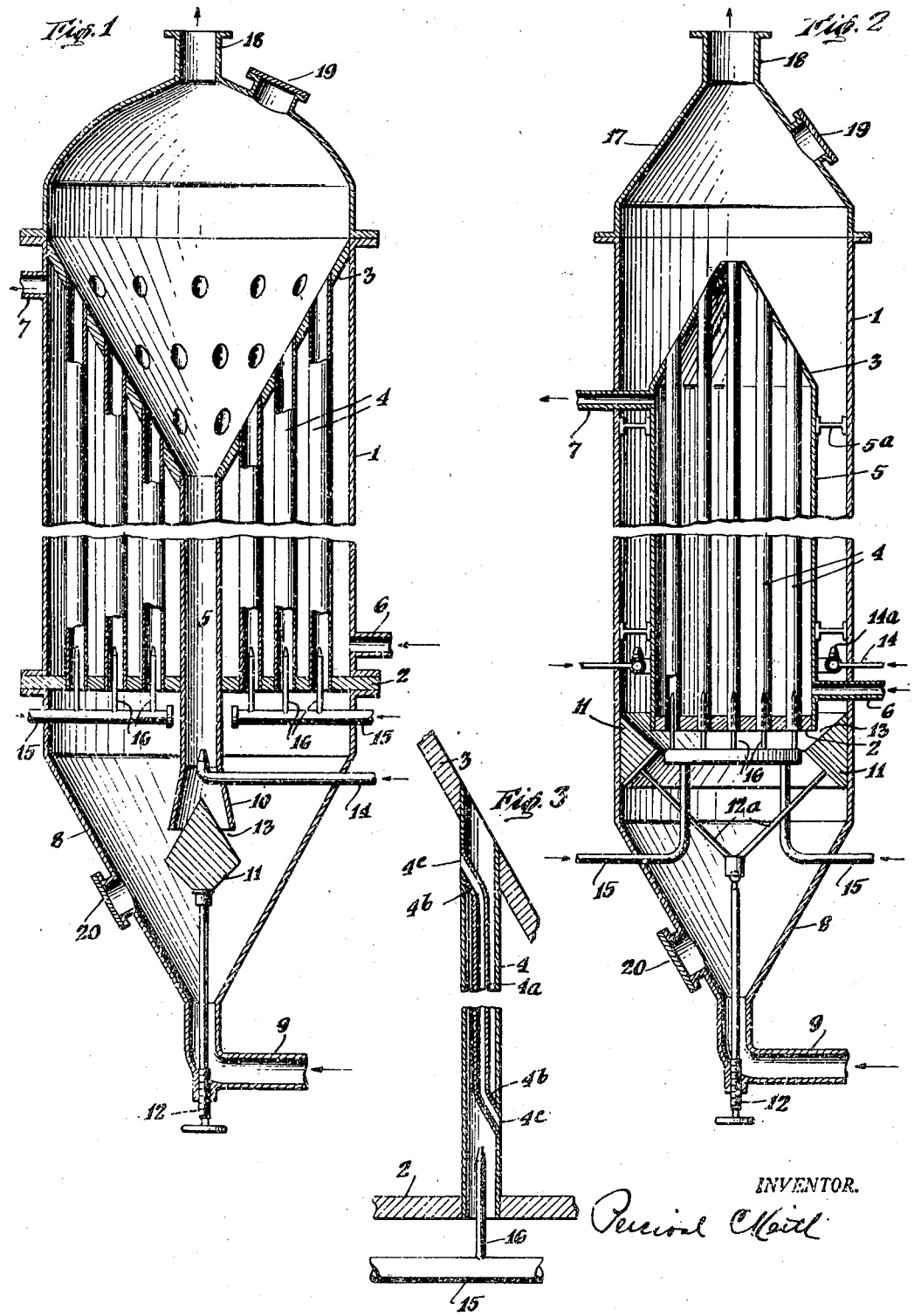

2,472,377

UNITED STATES PATENT OFFICE 2,472,377

PROCESS FOR HYDROCARBON SYNTHESIS

Percival C. Keith, Peapack, N. J., assignor to Hydrocarbon Research, Inc., New York, N. Y.

Application January 31, 1945, Serial No. 575,417

7 Claims. (Cl. 260—449.6)

This invention relates to an improved process and means for conducting reactions between carbon monoxide and hydrogen; more particularly, the invention is directed to the production of liquid hydrocarbons by the hydrogenation of carbon monoxide in the presence of a fluidized mass of pulverulent catalyst.

As is widely reported in the technical literature, a major problem that has been encountered in the commercialization of the synthesis of hydrocarbons is that of removing heat and controlling temperature in a practical and effective manner. The catalytic hydrogenation of carbon monoxide is a strongly exothermic chemical reaction and it is extremely important to prevent any appreciable rise in the desired reaction temperature inasmuch as a temperature rise of as little as 10° F. or less may shift the reaction to the production of less valuable products, e. g., fixed hydrocarbon gases like methane and ethane. Such a rise in reaction temperature not only lowers the yield of the more valuable liquid products by promoting the formation of gaseous products, but also increases the rate of reaction so that a vicious circle of rising temperature is initiated. Obviously, the greater the temperature rise, the greater is the shift in product distribution in the direction of less valuable products.

While numerous schemes have been proposed to meet these exacting requirements of heat removal and temperature control, as far as I know, not one has been found which is entirely satisfactory or free of some peculiar disadvantage. To my knowledge, the most specious schemes are those which have been disclosed in two recent patents.

One patent suggests flowing synthesis gases containing suspended therein the powdered catalyst through parallel tubular reaction zones without which a cooling medium is circulated to remove the heat of reaction. While this system is largely successful in the attainment of its prime objective, i. e., removal of the heat of reaction along the path of flow of the reaction gases, it has three serious handicaps from a commercial point of view. In the first place, for an adequate contact time between the synthesis gas and catalyst, the reactor must be of enormous volume and excessive height. The height is so great that the only practical way of erecting a plant of this type would be to use several reactors of reasonable height connected in series. Another shortcoming of this suggested process is the considerable attrition of the equipment and powdered catalyst which occurs at the high gas velocity required to carry the catalyst along in suspension. In addition, such a process necessitates cumbersome and expensive auxiliary equipment, particularly separators of gases and solids which are subjected to heavy attritive service. These factors make for such high installation and maintenance costs that it is genuinely doubted that a plant of this type can be economically feasible.

The other patent proposes passing synthesis gas through a fluent but dense mass of particulate catalyst, absorbing the heat of conversion in the catalyst, moving the catalyst from the synthesis zone to an outside cooling zone and reintroducing the cooled catalyst for absorbing the heat of reaction in the synthesis zone. While this method has the distinct advantage over the preceding one of reducing the volume and, especially, the height of the reaction zone to reasonable magnitudes, it suffers from the limitation that the removal of heat is dependent on the low specific heat of the catalyst. This means that a relatively large mass of catalyst must be circulated at a high rate. Furthermore, inasmuch as cooled catalyst is introduced into the bottom of the reaction zone and hot catalyst is withdrawn from the top of the zone, it is obvious that there is a thermal gradient along the height of the reactor. The adverse effect of a varying reaction temperature on the attainment of a desired product distribution has been previously mentioned.

A principal object of my invention is to provide a commercially attractive synthesis process in which the best features of fluidization and of a tubular reaction zone immersed in coolant are incorporated without entailing the usual attendant disadvantages.

Another important object is to provide a compact reactor in which the reaction zone is in tubular form and is maintained within very close limits at any desired reaction temperature.

A further object is to avoid the extensive installation of auxiliary equipment, such as cyclone separators, hoppers and the like, conventionally associated with gas-phase reactions involving powdered catalysts.

Still another object is to provide a method which ensures proper fluidization in each and all of several tubes which together form a reaction zone.

Other objects of my invention will be apparent in the description which follows:

In accordance with my invention, synthesis gas, i. e., carbon monoxide and hydrogen, is distributed to and passed up through, a multiplicity of tubular reaction zones which become one at their upper and lower ends. A suitable catalyst, e. g., powdered iron, in fluidized condition fills the tubular reaction zones as well as the merging zones at the upper and lower ends of the tubular zones. The tubular zones are surrounded with a coolant, such as water, Dowtherm or mercury, so that they can be maintained very closely to the desired reaction temperature. It is critical that the tubular zones, which in section may be elliptical, square or polygonal as well as circular, have an effective size of a pipe having an internal radius of not less than about ½ inch and not more than about 4 inches. By effective pipe size I mean that in any tubular zone the farthest catalyst particle shall be not less than about ½ inch and not more than about 4 inches away from the closest wall of the tubular zone. Preferably, the effective pipe size of my tubular reaction zones is not less than about 1 inch and not more than about 2 inches in internal radius. The tubular zone may be annular in section and, in such case, assuming that the inner surface of the annulus is a cooling surface, one-half of the width of the annulus is equivalent to the internal radius of a pipe. A relatively inert gas, e. g., hydrogen or a mixture of methane, ethane, etc., is introduced into the bottom zone so as to maintain the powdered catalyst therein in a fluidized state and to facilitate the flow of catalyst up into the tubular reaction zones as needed; the inert fluidizing gas also flows up the reaction tubes, mingling with the reaction gases. The combined gases discharge from the multiple reaction tubes into the top zone which is of larger horizontal cross-section than the sum of the cross-sections of the reaction tubes. Accordingly, the gases undergo a decrease in velocity so that a denser fluidized mass of catalyst is established in the upper zone in which the reaction tubes merge. Also, because of decreased velocity, the reaction gases which become disengaged from the bulk of the powdered catalyst in the upper zone and flow out of the reactor carry relatively little quantity of catalyst. While the fluidization art indicates that gas velocities over a wide range may be employed, I find it advisable with tubes of the size specified herein to keep the linear velocity of the gases within the range of about 0.1 to about 2.5 feet per second. My preferred range embraces gas velocities of about 0.5 to about 1.5 feet per second. In the upper and lower merging zones the gas velocity may be as low as 0.03 foot per second or even lower.

As mentioned hereinbefore, the size of the reaction tubes is critical to the operability and success of my process. From heat transfer considerations, smaller and smaller reaction tubes are desired to provide adequate cooling surface, but from the point of view of good fluidization larger and larger tubes are desired to minimize interfering wall effects. In reconciling these opposing factors I have determined that my tubular reaction zones must have an effective pipe size of about ½ inch to about 4 inches in internal radius. Those skilled in the practice of fluidization will appreciate the difficulties of maintaining a satisfactorily fluidized mass of pulverulent catalyst within each and every reaction tube of such small size when holding to gas velocities within the range specified hereinabove; for example, slight surges in the feeding of gases to the reaction tubes will tend to blow the catalyst out of one or more of the tubes. By my invention, such difficulties are largely overcome or their adverse effect is very considerably minimized inasmuch as proper fluidization is almost immediately re-established the moment that any interruption occurs. For such reasons, I maintain a relatively dense mass of fluidized catalyst in the upper zone to act as a stabilizing cap on the fluidized catalyst mass within the reaction tubes. The mass of fluidized catalyst in the bottom zone of my reactor acts as an emergency reservoir to supply catalyst promptly to any reaction tube from which part or all of its catalyst charge may have been transported into the upper zone of the reactor. To ensure further the attainment of good fluidization within the small reaction tubes, I prefer to have a standpipe or equivalent connection between the upper and lower zones, filled with fluidized catalyst, so as to permit the immediate flow of catalyst, which may be carried up out of the reaction tubes, to the lower zone whence the catalyst surges up into any reaction tubes deficient in catalyst content. The automatic and rapid replenishment of catalyst in the reaction tubes is conveniently achieved by a difference in the densities of the fluidized mass within the standpipe and the reaction tubes. A greater density in the standpipe exerts a pressure on the catalyst mass comparable to a hydrostatic head in a liquid system; this pressure causes the powdered catalyst in the lower zone to rise into the reaction tubes. While for the sake of elucidation I have set forth the foregoing theory of operation to explain the phenomena that occur in, and make possible, the operation of my process which is dependent upon the maintenance of good fluidization in relatively small tubes, I do not wish to be held thereto; it suffices to have an apparatus with the necessary and cooperating elements and to use such apparatus under the conditions brought out in this specification.

The invention will be more clearly and readily understood by reference to the accompanying drawing in which:

Figure 1 is a schematic representation in vertical section of one form of tubular reactor of my invention;

Figure 2 is a similar view of another form of tubular reactor and

Figure 3 is a vertical section of a modified reaction tube which may be embodied in the reactors of my invention.

The same numerals are used to indicate similar or equivalent elements in the three figures.

The reactors have a main reaction shell 1, preferably circular in horizontal cross-section, a bottom tube sheet 2 and a top tube sheet 3 which hold a multiplicity of reaction tubes 4. A standpipe 5 is shown in Figure 1 at the center of the bundle of reaction tubes 4 and in Figure 2 the standpipe is the annular space between the large tube or shell 5 and the reactor shell 1. In Figure 2, brackets 5a support shell 5 which encloses the bundle of tubes 4, by attachment to the main reactor shell 1. An inlet 6 serves to introduce a coolant into the zone surrounding the reaction tubes 4, while outlet 7 is for the withdrawal of heated coolant. The reactors have a tapered or funnel-shaped bottom section 8 with a gas inlet 9. In Figure 1, standpipe 5 is represented as having an expanded bottom portion 10; this seems desirable to minimize any tendency of the powdered catalyst to pack within the standpipe as the catalyst moves down therethrough. A conical plug 11 projects up into standpipe 5 and, by adjustment of the supporting threaded rod 12, plug 11 may be moved in or out to give any desired opening 13 at the bottom of standpipe 5. Similarly, in Figure 2 a ring 11 having a wedge-shaped cross-section is made to slide up or down to control the opening 13 at the bottom of the annular space which is used for the return of powdered catalyst to the bottom section 8 of the reactor. The position of the ring 11 is set by adjustment of the threaded rod 12, which through a ball-socket joint and forked rod members 12a supports the ring 11. Pipe 14 has a ring-shaped portion with several nozzles 14a to distribute a fluidizing gas within the annular zone outside of shell 5; in Figure 1, pipe 14 is likewise used for the introduction of fluidizing gas into standpipe 5. Pipes 15 are used for the introduction of synthesis gas. These pipes have several needle-like members 16 to feed the synthesis gas up into the reaction tubes 4. The reactors have a top section 17 with a vent pipe 18 for the withdrawal of the gaseous reaction products. Top section 17 may also have an opening or manhole 19 (shown covered up) for ready access into the top of the reactor. Opening 19 may be used for the charging of catalyst powder into the reactor. Similarly, the bottom section 8 may have an opening or manhole 20 (shown covered up) for the withdrawal of catalyst and for access into the bottom of the reactor. It is often found desirable to operate the reactor with a slow but continuous reactivation of the powdered catalyst. In such cases the openings 19 and 20 are connected to suitable piping for the continuous introduction of reactivated catalyst and for the continuous withdrawal of fouled or spent catalyst, respectively.

Figure 3 is a vertical section of a modified reaction tube 4 which has an inner tube 4a with bent portions 4b and openings 4c through the walls of tube 4. By this modification more cooling surface is introduced into reaction tube 4; such modification is particularly desirable with the larger reaction tubes. With this type of tube the reaction zone is annular in horizontal cross-section. The same coolant which surrounds tube 4 flows through tube 4a and accordingly maintains the same temperature on the inner and outer walls of the annular reaction zone.

I have shown the top tube sheet 3 as being conical so as to facilitate the movement of powdered catalyst that may discharge from the tops of the reaction tubes 4, back to the lower zone of the reactor whence the catalyst is fed up into the reaction tubes. In Figure 1, because of the conical sheet 3, the catalyst rising into the top zone of the reactor migrates more readily into the central standpipe 5, while in Figure 2 the inverted cone promotes the movement of catalyst discharging from the reaction tubes to the annular zone between shells 5 and 1. A flat tube sheet may be used at the top of the bundle of reaction tubes since the maintenance of an appreciable depth, say about 1 foot, of fluidized catalyst above the tube sheet will facilitate the movement of catalyst particles in horizontal directions.

Having described typical reactors of my invention as well as their operation, I shall cite the details of a synthesis plant producing 100 barrels per day of liquid hydrocarbons. The reactor is of the type shown in Figure 1; it has 300 reaction tubes made from steel tubing of 3-inch outside diameter ($\frac{7}{32}$-inch wall thickness) and a central standpipe having a 16-inch outside diameter. The 300 reaction tubes are distributed around the standpipe with clearances of about 1 inch between adjacent tubes. While the length of the reaction tubes varies somewhat because of the conical tube sheet at the top of the tube bundle, the average length of the tubes is 15 feet. The coolant surrounding the reaction tubes is water; the reactor therefore functions like a steam boiler in which the heat is supplied by conducting hot gases through the boiler tubes. By maintaining the cooling water under proper pressure, the reaction tubes may be held at any desired temperature. In the plant under discussion, the tubes are kept at a temperature of 600° F. The catalyst selected for this operation is a substantially pure iron powder which has been activated by the addition of about 1.0% of potassium oxide ($K_2O$) and about 2.0% of alumina ($Al_2O_3$). The powder is of such size that all passes through a 200-mesh screen and about 85% passes through a 325-mesh screen. The sizes of the catalyst particles are well distributed over a fairly broad range. There is sufficient fluidized catalyst in the reactor to fill the reaction tubes, the standpipe, and the upper and lower merging zones. The fluidized mass of catalyst has a psuedo-liquid level, i. e., the level at which the bulk of the reaction gases become disengaged from the fluid mass, which is about 1 foot above the upper end of the longest reaction tubes.

Fresh synthesis gas containing 1.2 to 1.3 volumes of hydrogen for each volume of carbon monoxide and minor proportions of carbon dioxide, water and nitrogen is introduced into the reactor at the rate of 510 pound-mols per hour. This synthesis gas with an average molecular weight of 15 is distributed and fed into the 300 reaction tubes. At the same time, 316 pound-mols of recycle gas flows through the reactor, about 90% of this gas entering through the lower conical section, thereby maintaining fluidization in the lower zone and making catalyst powder available for transport into any reaction tubes which may become deficient in catalyst content, and about 10% of the gas entering at the bottom of the standpipe to keep the catalyst therein in a fluid condition. The recycle gas which is the gas remaining after all the liquid products have been recovered from the effluent gases of the reactor is composed largely of carbon dioxide, hydrogen and gaseous hydrocarbons like methane, ethane and ethylene. The average molecular weight of recycle gas is 24. The 90% of recycle gas entering at the bottom of the reactor becomes distributed and flows through the 300 reaction tubes along with the fresh synthesis gas fed to each tube. The combined gases pass up through the reaction tubes with a linear velocity in the vicinity of 1 foot per second and satisfactory fluidization of the catalyst powder results. The reaction zone is under a pressure of 250 pounds gage.

With these conditions, 100 barrels (42 gallons per barrel) of liquid hydrocarbons are produced daily. The liquid product comprises about 80% of hydrocarbons boiling in the gasoline range, i. e., a fraction starting with hydrocarbons of four carbon atoms and ending at a boiling point of 400° F., and about 20% of hydrocarbons boiling above 400° F.

With the selected operating variables, the process not only yields valuable liquid hydrocarbons but also the operation is continuous and free of interruptive difficulties. Thus, because of satisfactory fluidization of the powdered catalyst within the reaction tubes and because of the extensive cooling surface of the reaction tubes, the entire reaction mass is maintained at the chosen temperature of 600° F. in spite of the great exothermicity of the hydrogenation of carbon monoxide. As previously pointed out, any tendency of the catalyst to be blown out of any reaction tube is immediately nullified by the reservoir of catalyst in the upper and lower zones of the reactor and in the standpipe connecting these zones. The combination of these zones and standpipe is analogous to an elevated water tank; the fluid is always ready to flow. In the fluid reactor of this invention, the moment any reaction tube is emptied of its catalyst charge, another charge of catalyst surges into it. The advantages of such continuous and steady operation are high yields of synthetic products, a favorable product distribution, and a long active life for the catalyst. The long catalyst life may be attributed to two factors: the close temperature control in my reactor prevents thermal injury of the catalyst resulting from sudden temperature surges and the passage of relatively non-reactive recycle gas up through the catalyst mass in the standpipe tends to volatilize or strip absorbed heavy hydrocarbons from the catalyst as it moves downwardly in countercurrent relation to the recycle gas. Because of the generally uniform condition of fluidity and turbulence of the catalyst mass in the several tubes, good heat transfer from the catalyst to the tube walls is established and fluctuations in reaction temperature are held within limits of as low as 5° to 10° F.

A distinct advantage of my invention over prior processes using finely divided catalysts resides in the fact that relatively small quantities of catalyst particles leave the reactor. Prior processes have been predicated on high rates of introduction and withdrawal of the catalyst in the reactor; such operation has necessitated elaborate systems for the separation of the powdered catalyst from the effluent reaction gases. These catalyst recovery systems, because of the heavy duty to which they are exposed, are large and expensive both in first cost and upkeep. In my process, a relatively dense phase of powdered catalyst in the upper zone of the reactor blankets the upper ends of the reaction tubes from which powder would otherwise be transported at an appreciable rate. The small quantity of powder which may leave the reactor by entrainment in the effluent gases is readily recovered by a suitable, small separator, e. g., a cyclone, bag filter, or the like. The recovered catalyst may be returned to the reactor by any of several known procedures, such as suspension in the recycle gases entering at the bottom of the reactor.

The catalyst employed in my process is an essential contributing factor for commercial operability. From this viewpoint, I prefer to use iron catalyst although catalysts of the other metals of the iron group, viz., cobalt and nickel, are well suited to my process and, in certain instances, may offer some advantages over iron. The catalyst is predominantly, i. e., at least 80%, a metal or a mixture of metals of the iron group. I am, of course, aware that various promoters and activators may be added to the iron group metals in minor proportions, i. e., not more than 20%, to modify the hydrocarbon synthesis reaction and thereby to yield different hydrocarbon products. Such promoters as compounds of alkali and alkaline earth metals, the oxides of titanium and silicon, and salts of molybdenum and chromium may be employed. Inasmuch as both components of synthesis gas, viz., hydrogen and carbon monoxide, are strong reducing agents, the powered catalyst charged to the reactor may be in the form of any readily reducible compound or compounds of metals of the iron group.

While relatively fine or relatively coarse catalyst powders may be used, I generally choose powders of about 200 to 400 mesh. Such powders preferably have a predominant fraction, say 85%, passing through a 325-mesh screen and the particle sizes in this fraction are distributed over a fairly broad range. Instead of pulverizing the catalyst itself, the catalytic material may be deposited by known technique on finely divided, inert supports like diatomaceous earth. Accordingly, powdered catalysts suitable for my fluid synthesis process embrace both the unsupported and the supported types.

It is understood that the selection of the several process variables, such as temperature, pressure ratio of carbon monoxide to hydrogen in the feed gas, catalyst composition, etc., depend largely on the products desired. There are extensive teachings in the technical literature which relate to the variables of the synthesis reaction and to their influence on the products obtained.

To recapitulate, my invention involves a synthesis process which employs powdered catalyst in a multiplicity of relatively small reaction tubes surrounded by a suitable coolant. The reactor with multiple tubes is of novel design and includes an upper and a lower zone which communicate with the respective ends of the reaction tubes and which are connected to each other through a vertical zone or passageway, viz., the standpipe of Figure 1 or the annular space of Figure 2. The tubes, the upper and lower zones and the connecting passageway are filled with fluidized catalyst, the fluidized mass being of higher density in the upper and lower zones and the connecting passageway than in the reaction tubes. This difference in density promotes, so to speak, the migration of powdered catalyst from these zones to the tubes and thus ensures that the tubes are at all times properly charged with fluidized catalyst. Inasmuch as the synthesis gas is admitted to, and flows through, the reaction tubes only in proximity of cooling walls, very sensitive thermal regulation is achieved.

It is clear that the apparatus of my invention is applicable more broadly to any chemical reaction between finely divided solids and vapors or gases, which involves a large quantity of reaction energy, whether exothermic or endothermic. In an endothermic reaction, a heating fluid instead of a coolant is circulated in contact with the exterior walls of the reaction tubes. In either case, the same accurate control of the reaction temperature is accomplished by a reactor which is largely automatic and foolproof in its functioning.

Those skilled in the art will appreciate that the process and apparatus of my invention will permit of many modifications. For example, it is not necessary to have a relatively large standpipe connecting the upper and lower zones of my reactor; instead, some of the several reaction tubes may be fed with gas at a lower velocity than that used in the other tubes so as to favor the migration of catalyst down through the tubes with lower gas velocity and up through the tubes with higher gas velocity. Similarly, the lower zone of the reactor may be fluidized by the introduction of a gas other than recycle gas, i. e., the residual fixed gases resulting from the synthesis reaction. Suitable gases include carbon dioxide, methane and hydrogen. Furthermore, recycle gas may be advantageously replaced by a vaporizable liquid. Such a liquid, e. g., the fraction of the synthesis products which boil at temperatures in the range of 300° to 500° F., would upon introduction into the bottom of the reactor be completely vaporized and the resultant vapors would fluidize the powdered catalyst. The use of liquid has the added feature that the heat of vaporization is abstracted from the hot catalyst so that partial cooling is effected and the cooling load or service of the walls of the reaction tubes is diminished correspondingly. Also, as is known in the art, synthesis conditions may be selected for the production of oxygenated organic compounds such as alcohols.

In view of the many possible modifications within the spirit of my invention, the claims which follow should be construed broadly and not in a restricted sense based on the illustrative embodiments presented herein.

What I claim is:

1. The process of synthesizing organic compounds through the catalytic hydrogenation of carbon monoxide, which comprises passing carbon monoxide and hydrogen up through fluidized synthesis catalyst maintained at reaction conditions and disposed in a multiplicity of tubular reaction zones each having a transverse section within which the innermost catalyst particle is not less than about ½ inch and not more than about 4 inches away from the periphery of said section and each being subjected to cooling for the extraction of heat from said catalyst, while fluidizing a mass of said catalyst with a substantially nonreactive gasiform medium in a lower zone communicating with said tubular zones to ensure substantially uniform fluidization in said multiplicity of tubular reaction zones, permitting said medium to flow up through said tubular zones along with said carbon monoxide and hydrogen, causing said gases to become disengaged from the bulk of said catalyst in an upper zone into which said tubular zones discharge, withdrawing said gases and recovering synthesized organic compounds therefrom.

2. The process of claim 1 wherein the gases flowing up through the tubular reaction zones have a linear velocity in the range of about 0.1 to about 2.5 feet per second.

3. The process of claim 1 wherein the several tubular zones are subjected to cooling from within as well as from without.

4. The process of synthesizing organic compounds through the catalytic hydrogenation of carbon monoxide, which comprises passing carbon monoxide and hydrogen up through fluidized synthesis catalyst maintained at reaction conditions and disposed in a multiplicity of tubular reaction zones each having a transverse section within which the innermost catalyst particle is not less than about 1 inch and not more than about 2 inches away from the periphery of said section and each being subjected to cooling for the extraction of heat from said catalyst, while fluidizing a mass of said catalyst with a substantially nonreactive gasiform medium in a lower zone communicating with said tubular zones to ensure substantially uniform fluidization in said multiplicity of tubular reaction zones, permitting said medium to flow up through said tubular zones along with said carbon monoxide and hydrogen, causing said gases to become disengaged from the bulk of said catalyst in an upper zone into which said tubular zones discharge, withdrawing said gases and recovering synthesized organic compounds therefrom.

5. The process of claim 4 wherein the gases flowing up through the tubular reaction zones have a linear velocity in the range of about 0.5 to about 1.5 feet per second.

6. The process of claim 4 wherein the several tubular zones are subjected to cooling from within as well as from without.

7. The process of conducting a thermal reaction of gaseous reactants in the presence of a fluidized catalyst, which comprises passing the gaseous reactants up through the fluidized catalyst maintained at reaction conditions and disposed in a multiplicity of tubular reaction zones each having a transverse section within which the innermost catalyst particle is not less than about ½ inch and not more than about 4 inches away from the periphery of said section and each being subjected to heat exchange conditions, while fluidizing a mass of said catalyst with a substantially nonreactive gasiform medium in a lower zone communicating with said tubular zones to ensure substantially uniform fluidization in said multiplicity of tubular reaction zones, permitting said medium to flow up through said tubular zones along with said gaseous reactants, causing said gases to become disengaged from the bulk of said catalyst in an upper zone into which said tubular zones discharge, withdrawing said gases and recovering reaction products therefrom.

PERCIVAL C. KEITH.

REFERENCES CITED

The following references are of record in the file of this patent:

UNITED STATES PATENTS

| Number | Name | Date |
|---|---|---|
| 2,046,816 | Fowler | July 7, 1936 |
| 2,224,049 | Herbert | Dec. 3, 1940 |
| 2,266,161 | Campbell | Dec. 16, 1941 |
| 2,318,602 | Duftschmidt | May 11, 1943 |
| 2,331,938 | Schutte | Oct. 19, 1943 |
| 2,347,682 | Gunness | May 2, 1944 |
| 2,360,787 | Murphree | Oct. 17, 1944 |
| 2,363,874 | Krebs | Nov. 28, 1944 |